(12) United States Patent
Matsuya et al.

(10) Patent No.: US 6,209,353 B1
(45) Date of Patent: Apr. 3, 2001

(54) METHOD FOR PRODUCING AN OBJECT HAVING A FLANGE AND APPARATUS THEREFOR

(75) Inventors: Toshikatsu Matsuya; Yoshiaki Ise; Shoji Takahashi, all of Yamagata (JP)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 09/030,481

(22) Filed: Feb. 25, 1998

(30) Foreign Application Priority Data

| Feb. 28, 1997 | (JP) | 9-061819 |
| Mar. 14, 1997 | (JP) | 9-082080 |
| Mar. 14, 1997 | (JP) | 9-082099 |

(51) Int. Cl.[7] ................................. C03B 23/20
(52) U.S. Cl. .................. 65/36; 65/57; 65/59.3; 65/59.33; 65/59.34; 65/108; 65/109; 65/120; 65/152; 65/276; 65/278; 65/279; 65/292; 65/DIG. 8; 65/DIG. 9; 264/248; 156/172; 156/187; 156/82; 138/109; 138/142
(58) Field of Search .................... 65/36, 29.14, 57, 65/DIG. 9, 271, DIG. 8, 120, 244, 59.3, 243, 59.33, 276, 59.34, 278, 108, 279, 109, 281, 160, 292, 152, 153, DIG. 13, 158, 29.11, 29.12; 264/248; 414/935; 156/172, 187, 82; 138/109, 142; 285/288.1, 405, 411, 416, 911; 29/DIG. 42

(56) References Cited

U.S. PATENT DOCUMENTS

| 348,556 | * | 9/1886 | Grueninger . | |
| 776,737 | * | 12/1904 | Greenfield . | |
| 3,186,820 | * | 6/1965 | Adkins ................... | 65/292 |

FOREIGN PATENT DOCUMENTS 44 36 646   12/1995   (DE) .

(List continued on next page.)

2294042  *  4/1996  (GB) .

Primary Examiner—Stanley S. Silverman
Assistant Examiner—Michael P. Colaianni
(74) Attorney, Agent, or Firm—Andrew L. Tiajoloff (57) ABSTRACT

A known method for producing an object having a flanged tubular portion at the outer periphery, comprises supplying a continuously extended, cylindrical body made of the flange material to a welding zone at the tubular portion of the object and welding the flange material to the welding zone by heating and winding the cylindrical body around the object. In order to provide a method and an apparatus for producing an object having a flanged portion at the outer periphery without requiring sophisticated manual technique or a manual skill of a well trained expert it is suggested that said method further comprises supplying the cylindrical body to the welding zone in a predefined feeding direction and with a adjustable feeding rate, heating a front end portion of the cylindrical body and melting it to the welding portion, continuously rotating of the object with a adjustable rotation speed, whereby the welding zone is moved in a direction parallel to the feeding direction, observing at least one boundary of the cylindrical body in order to detect a lateral displacement of the boundary in a direction vertical to the feeding direction; and providing an automatic control mechanism, whereby the detected displacement is used as a regulating variable. Furthermore an apparatus is suggested characterized by supplying means for continuously feeding of the cylindrical body with an adjustable feeding rate and in a predetermined feeding direction to the welding zone in such a manner that the front end is directed to and in contact with the welding zone, holding means for holding the object, whereby the object is rotatable along a rotational axis and with an adjustable rotation speed, whereby the welding zone is moving in a direction parallel to the feeding direction of the cylindrical body, heating means for heating and melting the front end of the cylindrical body when in contact with the welding zone, observing means to observe at least one boundary of the cylindrical body in order to detect a lateral displacement of the boundary in a direction vertical to the feeding direction; and controlling means using the detected lateral displacement as a regulating variable.

12 Claims, 8 Drawing Sheets

U.S. PATENT DOCUMENTS 3,925,132 * 12/1975 Bartlow et al. ...................... 156/172
5,158,589 * 10/1992 Curtis et al. ........................... 65/279
5,639,288 * 6/1997 Schoubye ................................ 65/57
5,904,182 * 5/1999 Breidenbach et al. ............... 138/109

* cited by examiner

METHOD FOR PRODUCING AN OBJECT HAVING A FLANGE AND APPARATUS THEREFOR

INDUSTRIAL FIELD OF APPLICATION

The present invention relates to a method for producing an object having a flanged tubular portion at the outer periphery, by supplying a continuously extended, cylindrical body made of the flange material to a welding zone at the tubular portion of the object and welding the flange material to the welding zone by heating and winding the cylindrical body around the object, and it relates to an apparatus for producing an object having a flange which comprises feeding a continuously extended, cylindrical body made of flange material having a molten front end to a welding zone of the object.

PRIOR ART

Heat treatment of a semiconductor wafer has been performed conventionally by an operation comprising mounting the wafer on an airtight sealed reaction vessel, applying heat treatment, and taking out the heat treated wafer. Accordingly, it was necessary to provide the reaction vessel detachable from the mounting table, while also joining an aperture portion in an airtight manner on the mounting table. Thus, in general, a flange portion is provided on the outer periphery of the reaction vessel, so that the reaction vessel may be brought tightly into contact with or separated from the mounting table by the flange portion.

On forming the flange portion on the aperture portion of the reaction vessel, a plate material is perforated in such a manner that the hole may match the inner diameter of the aperture portion, cut into a donut-like plate having the desired outer dimension, and the resulting donut-like flange portion is welded to the aperture end of the reaction vessel. The resulting structure is subjected to mechanical processing thereafter to realize a smooth connection state on the inner diameter plane and the outer diameter plane by shaving them to remove irregularities that are formed previously by welding.

In the conventional technique above, a large portion of the plate material had to be wasted in forming the flange portion therefrom, and, moreover, the process required mechanical shaving to form a continuous smooth surface on the portion connecting the flange portion to the reaction vessel. This required a use of the material at a large quantity, as well as an incorporation of additional process steps which involves consumption of tools and an uneconomical increase of process steps.

In order to overcome the above mentionend problems another technique is suggested in JP-A-Hei8-178169. The known technique, which is shematically shown in FIG. 8. comprises winding a ribbon of a quartz glass plate 103 around the surface of the ends of a transparent quartz glass tube 101 having a uniform cross section along the longitudinal direction thereof, and then heating and welding by heating the entire structure by means of a first burner 106 and a second burner 107.

Problems the Invention is to Solve

Figure 8:
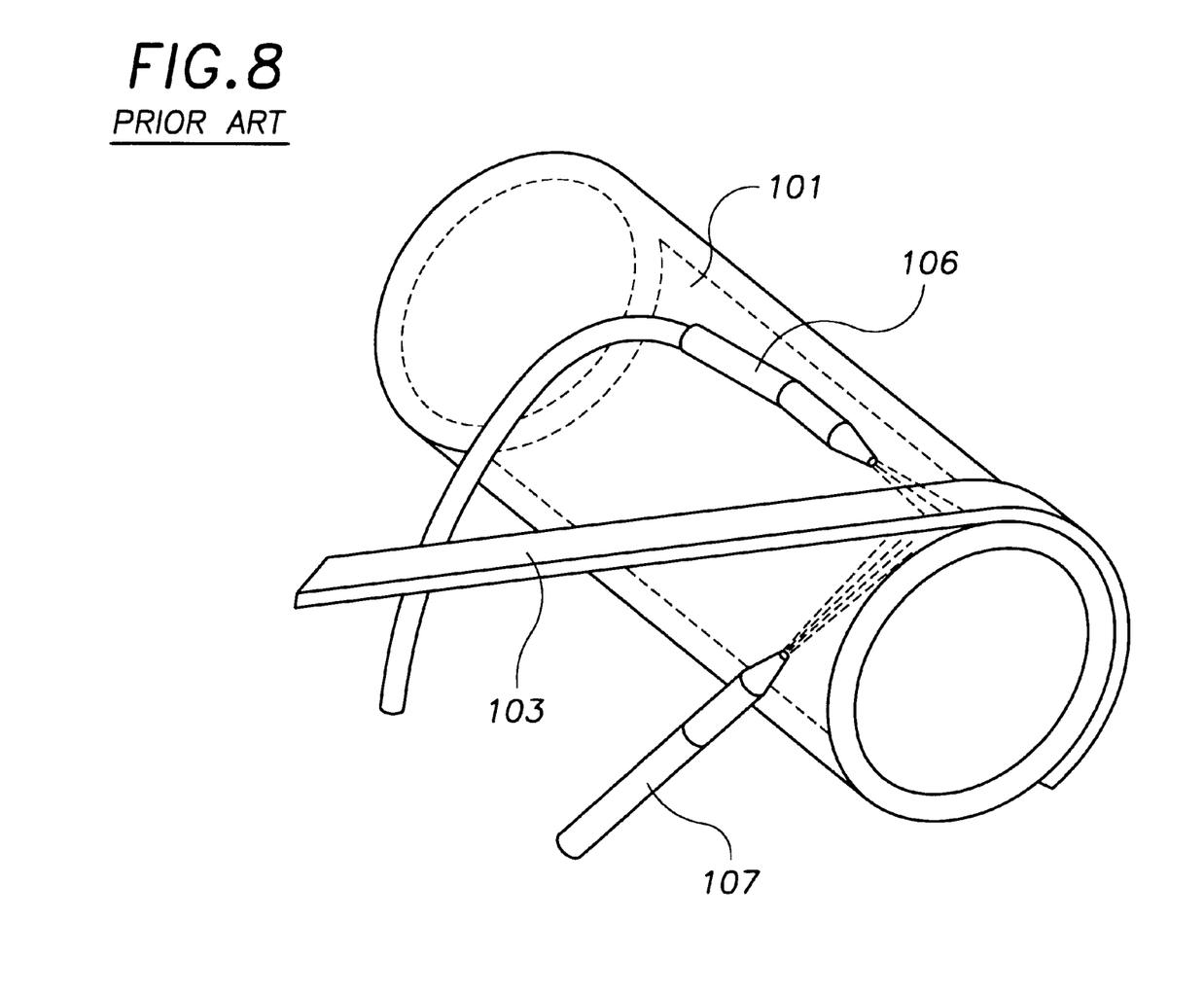
FIG. 8 is a schematically drawn structure of a conventional method to make a flange.

However, in the technique above, the quartz glass member 103 is heated by the first burner 106 until it becomes soft enough that it may be easily bent, then, is wound up around the outer periphery of the quartz glass tube 101 while the quartz glass tube 101 is rotated in the direction of the outer plane, and, at the same time, the lower plane of the quartz glass member 103 is heated by the second burner 107 in such a manner that both planes to be joined may be melt. Thus, the quartz glass member 103 is welded to the surface of the quartz glass tube 101.

It can be seen therefore that this method requires a welding operation while manually controlling the burners, the rotation speed, and the like depending on the welding state that is influenced by the thickness of the quartz glass member 103, burner temperature, rotation speed of the quartz glass tube 101, etc. Such a welding operation requires sophisticated manual technique or a manual skill of a well trained expert.

In the light of the aforementioned circumstances, an object of the present invention is to provide a method and an apparatus for producing an object having a flanged portion at the outer periphery without requiring sophisticated manual technique or a manual skill of a well trained expert.

Another object of the present invention is to provide a method and apparatus for producing tubes or vessels having flanged portion on the outer periphery of the tubular portion, which are economical and require use of less material and process steps.

Means for Solving the Problems

Concerning the method the above mentioned objects are achieved by a method comprising the following steps:

supplying the cylindrical body to the welding zone in a predefined feeding direction and with a adjustable feeding rate, heating a front end portion of the cylindrical body and melting it to the welding zone, continuously rotating of the object with a adjustable rotation speed, whereby the welding zone is moved in a direction parallel to the feeding direction, observing at least one boundary of the cylindrical body in order to detect a lateral displacement of the boundary in a direction vertical to the feeding direction; and providing an automatic control mechanism, whereby the detected displacement is used as a regulating variable.

Figure 1:
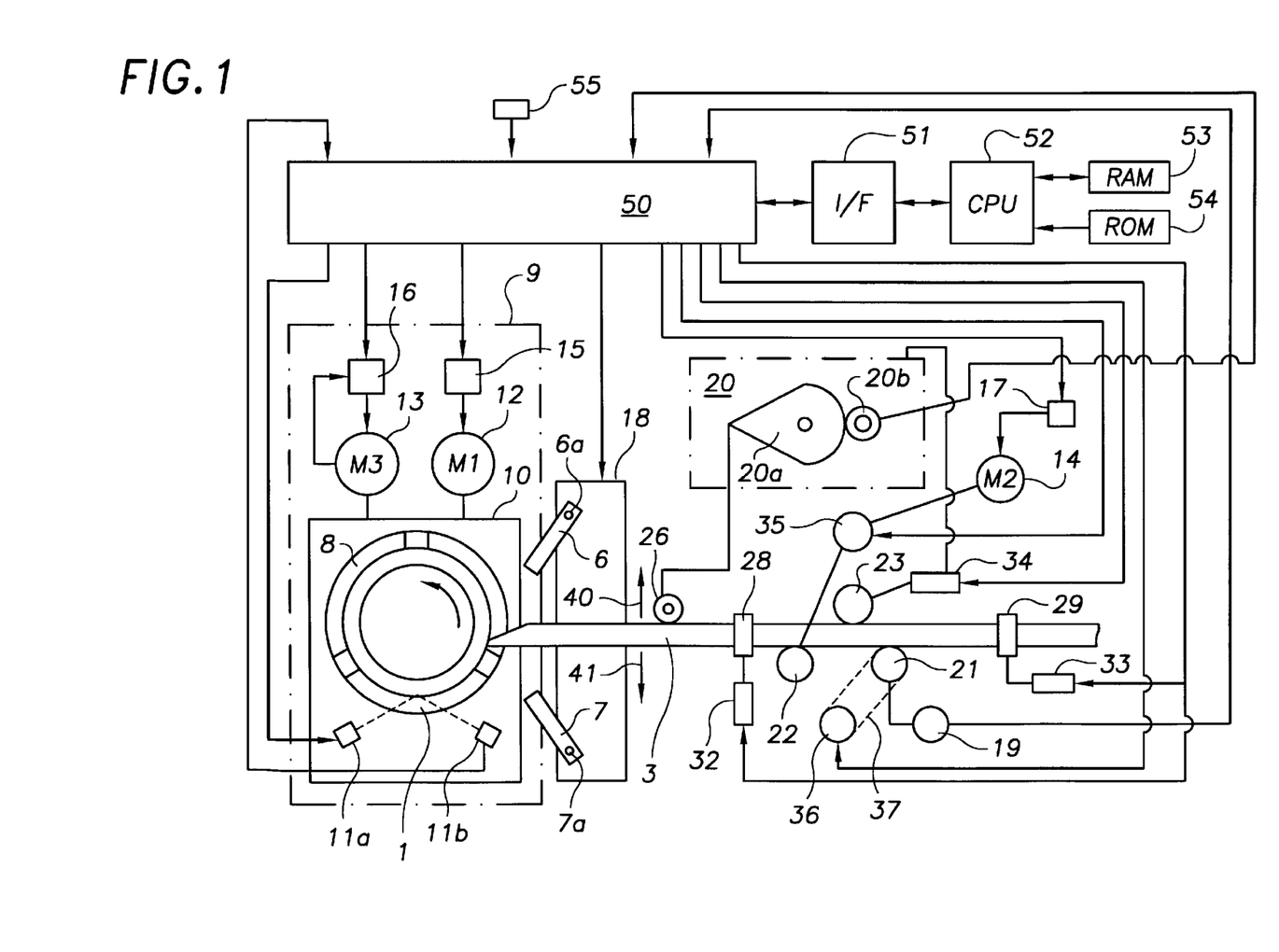
FIG. 1 shows a block constitution according to a supply apparatus for the continuously cylindrical body.
Figure 2:
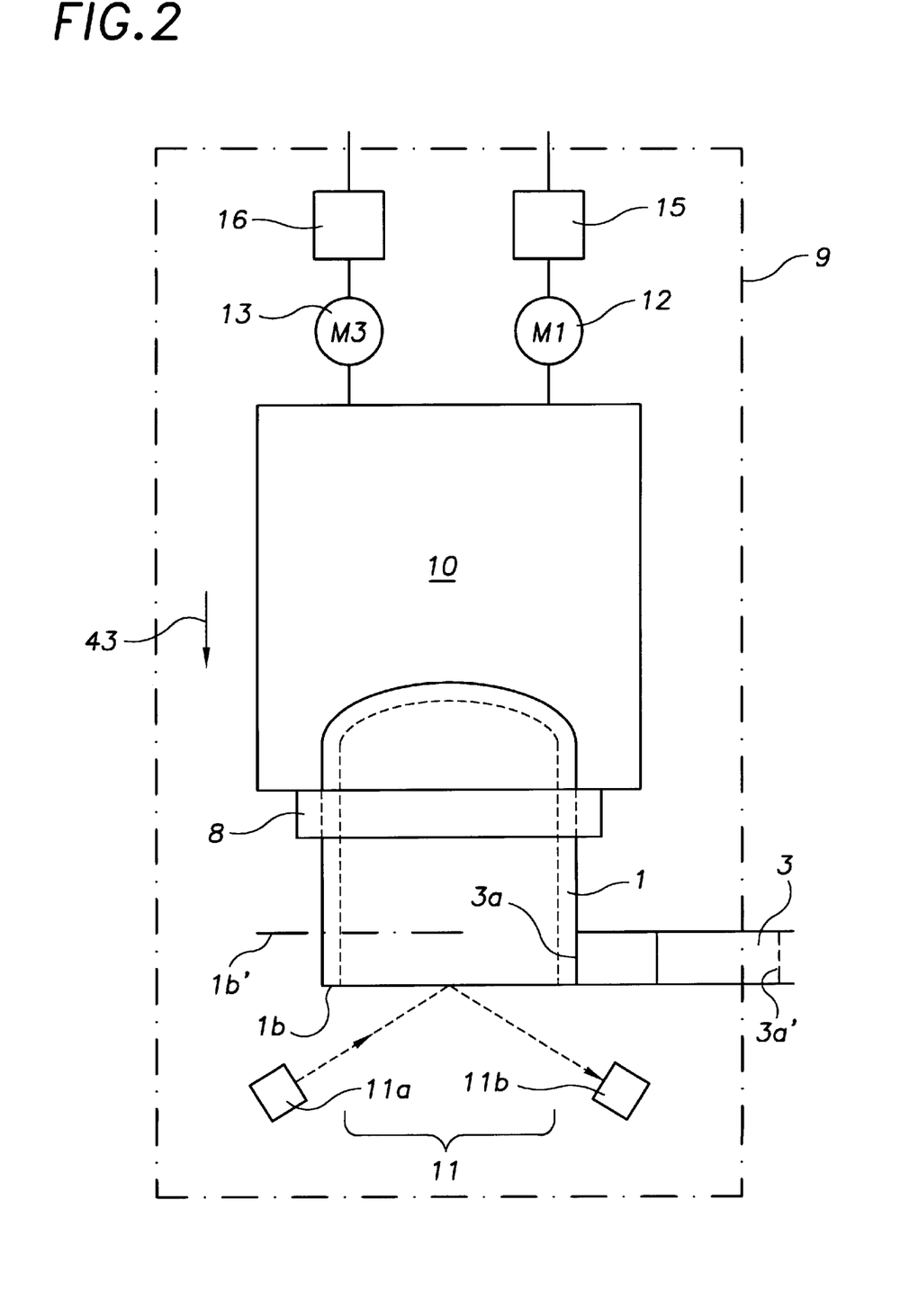
FIG. 2 is an explanatory diagram showing the initial operation.

The end plane of a cylindrical body (e.g., a quartz glass plate) is brought into contact with the outer periphery of the tubular portion of a quartz glass tube 1 as shown in FIGS. 1 and 2, and the front end portion of the cylindrical body inclusive of said end plane is heated and fused.

It was found that if the quantity of the front end portion to be heated and molten is equal to the quantity received by the tubular portion in the welding zone while rotating, that is, if the rotation speed of the tubular portion is set properly in accordance with the quantity that is heated and molten, no displacement occurs on the cylindrical body in the direction (indicated by arrows 40 and 41) that crosses the feeding direction. If however the rotation speed of the tubular portion of the quartz glass tube 1 is too high, the quartz glass plate 3 is pulled by the tubular portion of the quartz glass tube 1 at a quantity exceeding the amount that is heated and molten. Thus, the cylindrical body (quartz glass plate 3) undergoes deformation in the direction shown by the arrow 40, because of the viscosity of the molten quartz glass, resulting in a lateral displacement of the boundary of the cylindrical body. If, on the other hand, the rotation speed of the tubular portion is too low, then the force pulling the quartz lass plate 3 becomes weak as to cause a lateral displacement in the direction indicated by the arrow 41. The displacement of the cylindrical body can be observed within the welding as well as before the welding zone.

So, according to the invention the lateral displacement vertical to the feeding direction of the boundary of the cylindrical body is continuously observed. The observed values are used in an automatic control mechanism for the process. When detecting a displacement a correcting variable of the process is changed in such a way that the displacement disappears again.

In an preferred embodiment of the invention the feeding rate of the cylindrical body is used the correcting variable. In an other preferred embodiment the rotation speed of the tubular portion is used the correcting variable. Thus the displacement is detected in the direction crossing the direction of feeding the cylindrical body, and the feeding rate of the cylindrical body is varied in accordance to the quantity of displacement. Accordingly, no high manual technique or a well trained expert is required in feeding the cylindrical body in a molten state.

Alternatively the rotation speed of the tubular portion as well as the feeding rate of the cylindrical body simultaneously may be used as correcting variables in the automatic control mechanism. Accordingly if one of the feeding rate and the rotation speed may exceed the control range, adjustment can be made by the other. Thus, even in case it is impossible to control the rotation speed, the other variable can be used for the control. Hence, a wider control range is provided and the control itself is facilitated.

Furthermore, a method was found to be suitable, wherein the overall amount of flange material supplied to the welding zone is measured and the supply of the cylindrical body is automatically stopped after the amount has reached a predetermined maximum value. Alternatively the overall value of the objects' rotating movement is controlled and the supply of the cylindrical body is automatically stopped after the value has reached a predetermined maximum value. The object may continue its rotation while the supply of the quartz glass plate 3 is ceased. Thus, the molten portion is cut and separated from the portion remaining without being molten. It can be seen therefrom that the cylindrical body can be cut by simply ceasing the feeding thereof without providing any additional special means for cutting.

It is also an effective means according to present invention to constitute as such that the quantity of predetermined supply of the cylindrical body or the quantity of movement of the object to be welded is obtained to shut down the supply of the cylindrical body in accordance thereto, or that the predetermined amount of supply for the cylindrical body or the moved quantity for the object to be welded is obtained, and in stopping, the cylindrical body is pulled back in the direction opposite to the feeding direction.

By constituting as such that the supply of the cylindrical body is stopped on observing a predetermined supply amount of the cylindrical body or the moved quantity for the object to be welded, the molten portion is cut from the non-molten portion because the supply of the quartz glass plate 3 is stopped while the quartz glass tube 1 keeps rotating.

It can be seen therefrom that the cylindrical body can be cut by simply ceasing the supply thereof without providing any additional special means for cutting.

It is also an effective means to constitute as such that the supply of the cylindrical body is stopped according to an observed predetermined amount of supply of the cylindrical body.

Figure 7:
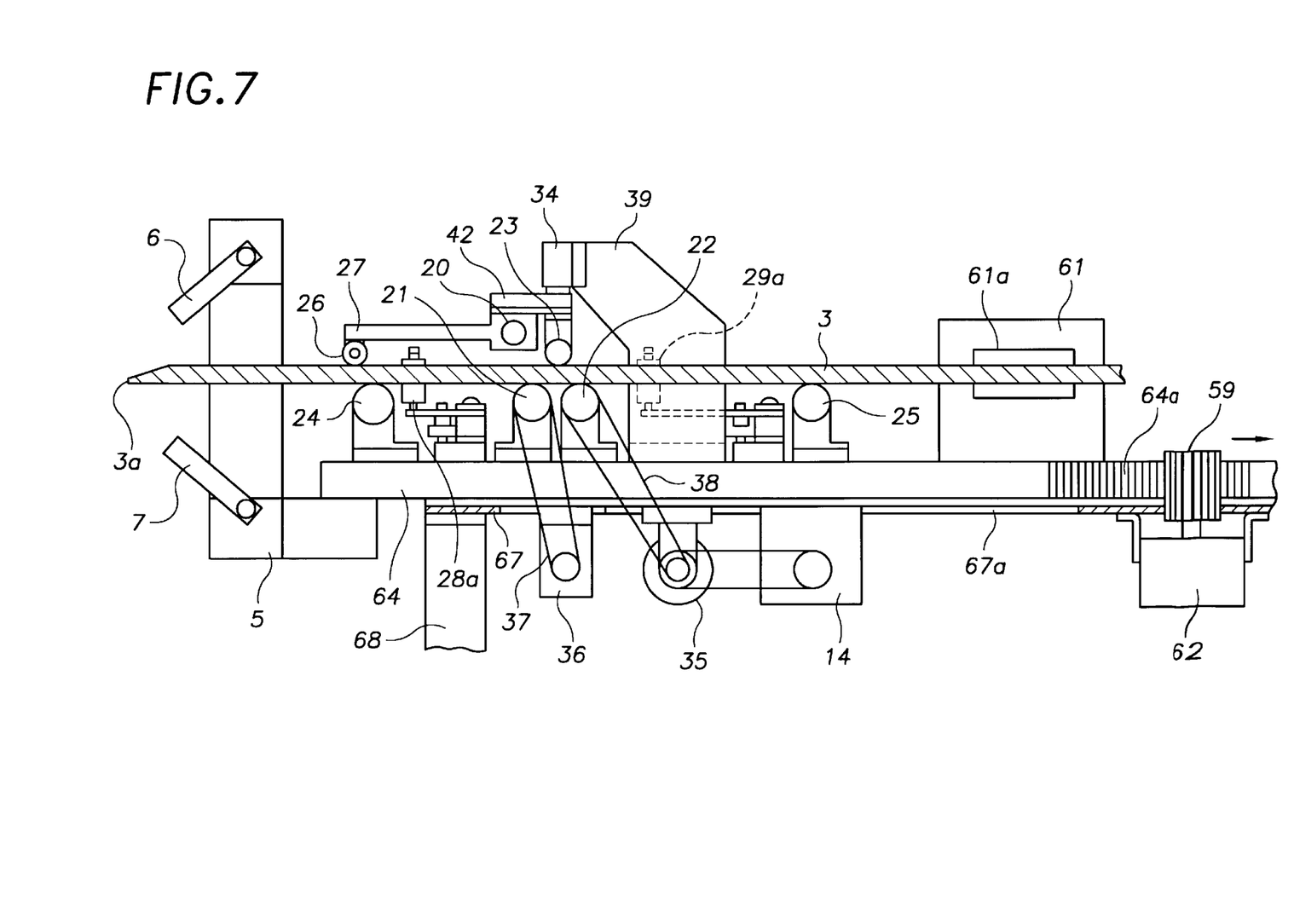
FIG. 7 is a cross section view showing the important portion of the mechanism according the embodiment shown in FIG. 6.

Furthermore a method was found suitable which comprises a drawing back the cylindrical body in a direction opposite to the supplying direction. The cutting is further facilitated while producing no excessive melting of quartz glass plate. Furthermore, by constituting the cylindrical body above in such a manner that it is pulled backward upon stopping its supply, for instance, as shown in FIG. 7, the quartz glass plate 3 is clamped from both sides by a pair of a grip means 61, 61 provided on both sides in the width direction of the quartz glass plate 3 mounted on a mounting and feeding means 64 for the cylindrical body, while the rotation of a gear 59 connected to a motor 62 is transferred to a rack 64a so that the mounting and feeding means 64 for the cylindrical body moves toward the direction indicated by an arrow. Thus, it can be seen that cutting of the quartz glass plate 3 can be facilitated and no excess melting occurs on the quartz glass plate 3.

Furthermore, other effective means for realizing the invention comprises rotating the object for a plurality of times to superpose the cylindrical body during winding, whereby a plurality of flange layers are formed having a predetermined thickness, whereby the welding zone is moved in a direction vertical to the rotational axis in accordance with the overall thickness of the flange layers.

By rotating the object (quartz glass tube 1) for a plurality of times while bringing the cylindrical body (quartz glass plate 3) in close contact with the outer periphery of the quartz glass tube 1, the quartz glass plate 3 can be superposed in winding it up. In this case, the outer diameter of the flange increases by the plate thickness each time the quartz glass plate 3 is wound up one time. Thus, if the quartz glass tube 1 is rotated at the same speed, it results in that the glass plate 3 is wound up in an insufficiently molten state on the outer periphery of the flange, because the speed of the outer periphery is increased at that time. In this case, accordingly, the glass plate 3 is pulled by the flange of the glass tube 1, and is displaced to the direction indicated by an arrow 40 shown in FIG. 1. The displacement controls the rotation speed of glass tube 1 to become lower in such a manner that the moving speed of the welding zone in winding up the glass plate 3 may be equal to that in the previous stage.

Furthermore, it is preferred to provide the melting position for the cylindrical body that is supplied to the welding zone in an adjustable manner, so that the position of melting using a heating means can be moved depending on the rotation times of the flange material. By employing such a constitution, the position of melting using a heating means at the end portion of the cylindrical body can be set at the same place even if the flange diameter is increased.

Preferably during melting to the welding zone, a predetermined torque is applied to the cylindrical body and the torque is controlled and adjusted to the predetermined value. It was found that, if the force for pressing the cylindrical body against the welding zone of the object to be welded is low, the welding zone remains without being sufficiently pressed against the molten portion of the cylindrical body, and hence results in a molten portion having a low inner pressure as to form a welded portion containing pores. On the other hand, if the aforementioned force for pressing is too high, the molten end portion of the cylindrical body is pressed by the force and runs in the width direction resulting in a cylindrical body welded to the outer periphery of the object at an unnecessarily extended width. In such a case, the amount of flange material to be mechanically removed after completion of welding increases, and the cylindrical body is welded thinly due to the molten portion that has run in the width direction thereof. Accordingly, it is more complicate to obtain the required welding thickness.

Furthermore, in case the outer periphery of the object to be welded lacks high circularity, i.e., if it comprises a surface of larger or smaller diameter around the center of rotation of the object, or an irregular outer peripheral surface, when the cylindrical body is supplied with a predetermined torque, the outer peripheral surface of the object to be welded changes.

More specifically, as the outer peripheral surface approaches the molten edge portion of the cylindrical body beyond a standard value, the outer peripheral surface of the object to be welded is pushed back as to increase the feeding load applied to the cylindrical body, thus resulting in a reduced amount of the supplied cylindrical body. If the outer peripheral surface of the object to be welded changes in such a manner that the distance between the outer peripheral surface portion and the molten end portion of the cylindrical body increases, the feeding load decreases as to slightly increase the force of pressing. Thus, the quantity of supplying the cylindrical body increases. Thus, even in case the object to be welded does not have a surface of high circularity, automatic control functions by applying a predetermined pressure to the cylindrical body even in case the shape of the surface changes.

With regard to the apparatus the above mentioned objects are achieved according to the present invention by an apparatus comprising:

supplying means for continuously feeding of the cylindrical body with an adjustable feeding rate and in a predetermined feeding direction to the welding zone in such a manner that the front end is directed to and in contact with the welding zone, holding means for holding the object, whereby the object is rotatable along a rotational axis and with an adjustable rotation speed, whereby the welding zone is moving in a direction parallel to the feeding direction of the cylindrical body, heating means for heating and melting the front end of the cylindrical body when in contact with the welding zone, observing means to observe at least one boundary of the cylindrical body zone in order to detect a lateral displacement of the boundary in a direction vertical to the feeding direction; and controlling means using the detected lateral displacement as a regulating variable.

Figure 5:
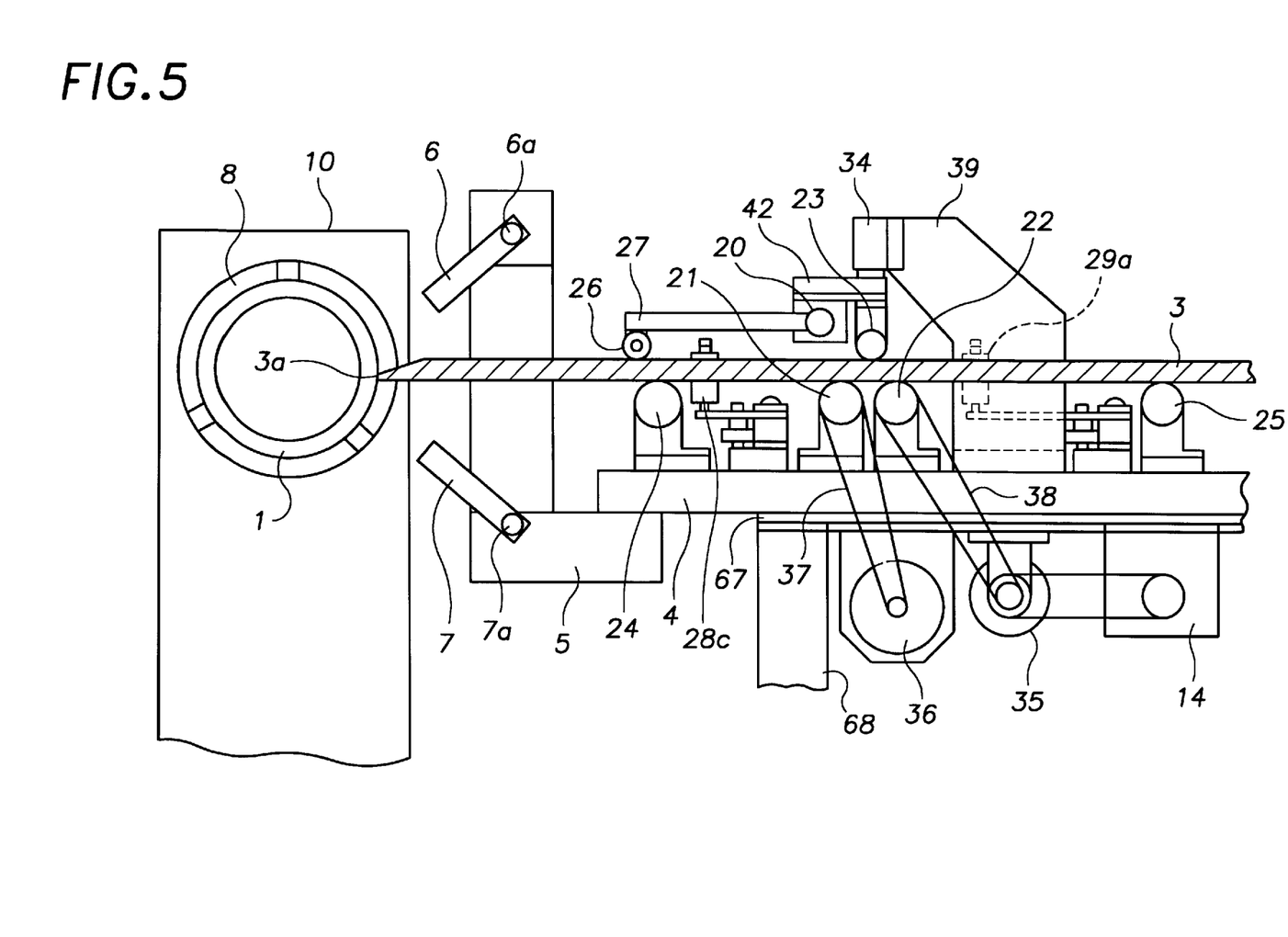
FIG. 5 shows a cross section view taken along line A—A in FIG. 4.

The apparatus according to the invention comprises, for instance, as shown in FIG. 1, 2, or 5, means for holding the object 1 to be welded (a quartz glass tube attaching portion) 10 which is movable in the direction of supplying the cylindrical body (a quartz glass plate) 3; supplying means for continuously feeding the cylindrical body (a base table 4 and feeding roller 22), which sends out the cylindrical body 3 in such a manner that the end plane thereof is brought into contact with the welding zone of the object 1; heating means (a first burner 6, a second burner 7, and a burner fixing table 5 (FIG. 5)) for heating and melting the front end portion of the cylindrical body inclusive of the end plane, when it is in contact with the welding zone at the outer periphery of the quartz glass tube 1; observing means (a detection roller 26 and an encoder 20), which detects the displacement in the direction crossing the feeding direction of the cylindrical body; and conrolling means for the control of the process for which the apparatus is used, whereby the controlling means use the detected lateral displacement as a regulating variable.

The tubular portion of the glass tube 1 is rotated in the direction of the tubular periphery, and, at the same time, the glass plate 3 is fed in the direction of the tubular portion. If the amount to be heated and molten is equal to the amount wound up by the tubular portion, no displacement of the quartz glass plate 3 generates in the direction (indicated by arrows 40 and 41) crossing the feeding direction of the cylindrical body.

If the rotation speed of the glass tube 1 is too high as compared with the amount that is melt adhered to the glass tube 1, the quartz glass tube 1 drags the quartz glass plate 3 in such a manner that the quartz glass plate 3 is distorted in the direction indicated by the arrow 40. If the rotation speed of the glass tube 1 is too low, the amount of molten portion increases, and the force that attracts the solid portion of the quartz glass plate decreases as to cause displacement on the quartz glass plate 3 in the direction indicated by the arrow 41.

In a first preferred embodiment the feeding rate of the cylindrical body is varied in accordance with the output of the means of detecting the displacement of the cylindrical body which is provided during the movement of the welding zone. The speed of supplying the cylindrical body is varied in accordance with the output from the means of detecting the displacement of the cylindrical body; accordingly, the feeding rate is controlled within a predetermined range in correspondence to the detected quantity of displacement. Thus, the apparatus requires no high manual technique or a well trained expert is required in feeding the cylindrical body in a molten state. It may be sufficient that the apparatus according to the first embodiment is equipped with speed control means (a motor control circuit 17 and another motor control circuit 16) which control the feeding rate of the cylindrical body 3.

In a further preferred embodiment the rotation speed is varied in accordance with the output of the means of detecting the displacement of the cylindrical body which is provided during the movement of the welding zone. The apparatus according to this embodiment is equipped with rotation speed control means which control the rotation speed of the object (glass tube).

Thus, by detecting the displacement distance, the feeding rate of the cylindrical body 3 and/or the rotation speed of the glass tube is controlled within a range depending on the displacement. In case that feeding rate as well as rotation speed are used as a correcting variable, even if one of the correcting variables may exceed the control range, adjustment can be made by the other. Thus, the apparatus has a wider control range. Thus, because the apparatus according to this embodiment of the present invention comprises detecting the displacement in the direction crossing the feeding direction during moving the welding zone of the object to be welded, and variable controlling the feeding rate and the rotation speed of the welding zone according to the thus detected displacement. It can be seen therefrom that even in case it is impossible to control the rotation speed, the other variable can be used for the control. Hence, a wider control range is provided and the control itself is facilitated.

It is also an effective means of the present invention to constitute as such that the apparatus comprises arithmetic means for obtaining the overall value of the amount of flange material supplied to the welding zone, and shut down means for stopping the supply of the cylindrical body. So the supply of the cylindrical body is stopped based on the obtained quantity of supplied flange material.

Furthermore, by providing an arithmetic means for obtaining the supply quantity of the flange material inside the control circuit 50 as well as a stopping means (brake) 36 which ceases the feeding operation of the supply means, a predetermined value of the overall quantity of flange material can be obtained and the supply of the cylindrical body can be automatically stopped according thereto. In this case, the quartz tube 1 continues its rotation while supply of the quartz glass plate 3 is ceased. Thus, the molten portion is cut and separated from the portion remaining without being molten. It can be seen therefrom that the cylindrical body can be cut by simply ceasing the sending out thereof without providing any additional special means for cutting. At the same time, by providing a heating means in such a manner that the melting position is set adjustable, the heating means can be moved synchronously in the direction farther from the glass tube 1 with the stopping of the glass plate 3. This signifies stopping the end plane of the cylindrical body at a position sufficiently separated from the outer diameter of the thus formed flanged portion; hence, the outer peripheral plane can be prevented from being contaminated due to the sagging of the molten end planes of the cylindrical body which occurs by the delay in stopping heating of the heating means.

It was found suitable that the shut down means comprise a pulling device for the pulling back of the cylindrical body in a direction opposite to the feeding direction. By constituting the cylindrical body above in such a manner that it is pulled backward upon stopping its supply, for instance, as shown in FIG. 7, the quartz glass plate 3 is clamped from both sides by a pair of a grip means 61, 61 provided on both sides in the width direction of the quartz glass plate mounted on a mounting and feeding means 64 for the cylindrical body, while the rotation of a gear 59 connected to a motor 62 is transferred to a rack 64a so that the mounting and feeding means 64 for the cylindrical body moves toward the direction indicated by an arrow. Thus, it can be seen that cutting of the quartz glass plate 3 can be facilitated and no excess melting occurs on the quartz glass plate.

A suitabe embodiment of the apparatus according to the invention comprises feeding the cylindrical body in the welding direction at a predetermined torque. Thus, the cylindrical body is welded to the object to be welded at a predetermined thickness as to minimize the amount to be shaved by the mechanical process applied upon completion of welding.

A more effective means for the first aspect of the present invention comprises constructing the apparatus above further equipped with a torque detection means which detects the fluctuation in torque of the cylindrical body; a clutch means which is capable of controlling the transmission force from the drive source; and a clutch control means which controls the transmission output from the clutch means; provided that the torque is adjusted to the predetermined value.

By constructing the apparatus above in such a manner that it comprises, for instance, a torque detection means (a torque sensor) 36, a clutch means (an electromagnetic clutch) which is capable of controlling the transmission force from a drive source (a motor) 14, and a clutch control means (a control circuit) 50 as to control the torque at a predetermined value, favorable welding can be performed without lowering the pressure applied to the cylindrical body to an unnecessarily low level, without incorporating pores in the welded portion of the object to be welded, and yet, without excessively increasing the pressure to an unnecessarily high level.

Mode of Practicing the Invention

Preferred embodiments according to the present invention is described below by referring to some examples and to the drawings. However, it should be noticed that the description below is provided only as examples, and that the present invention is not only limited to the dimension, material, shape, relative positions, etc., of the constitutional components unless specifically denoted.

BRIEF DESCRIPTION OF THE DRAWINGS

FIG. 1 is a block diagram showing a constitution according to a first embodiment of the present invention. Referring to FIG. 1, a RAM 53 and a ROM 54 memorizing the control program are connected to a CPU 52, and the CPU 52 is connected to a control circuit 50 which controls each of the mechanisms via an interface circuit 51.

The control circuit 50, which starts drive control upon input of a START signal 55, is set in such a manner that it receives a signal from a photoreceptor portion 11b of a sensor 11 which detects the position of the aperture end plane of the quartz glass 1 in the direction vertical to the plane of FIG. 1, and a signal from an encoder 19 which detects the feed quantity of the quartz glass plate 3.

The control circuit 50 is constructed as such that the transmission torque transferred to the glass plate 3 via the clutch 35 and the roller 22 is detected by a torque sensor 36 from the detection roller 21 via a belt 37, and is input as a detection signal.

Furthermore, a displacement detection roller 26 is placed in contact with the upper plane of the quartz glass plate 3, and the displacement of the roller 26 in the direction indicated by the arrow 40 or the arrow 41 is transferred to an encoder 20 comprising an arc-shaped gear plate 20a and a detection gear 20b, so that a signal may be transferred from the encoder 20 to the control circuit 50.

The control circuit 50 sends out the signal to CPU 52 upon receiving the input signal above, and receives arithmetic signal from CPU 52 to send out an output.

Each of the functional components which is driven in accordance with the output signal from the control circuit is described below.

A quartz glass tube drive control unit (referred to hereinafter as "drive control unit") 9 comprises a quartz glass tube attaching portion 10 which holds a quartz glass tube 1, to which a flange portion is to be welded on the outer peripheral plane thereof, by a chuck 8, a motor 12 having a control means 15 which moves the quartz glass tube 1 forward and backward in the axial direction, a motor 13 having a control means 16 which controls the rotation speed of the quartz glass tube 1 in the direction of the peripheral plane, and the sensor 11 above having a photoreceptor portion 11b and a light-emitting portion 11a to detect the position of the aperture end plane of the quartz glass tube in the axial direction.

The control means 15 for the motor 12 drives the motor 12 in accordance with the order signal given by the control circuit 50, and stops the motor 12 on receiving a stop signal from the control circuit 50, which is sent in accordance with the signal given by the photoreceptor portion 11b of the sensor 11.

The control means 16 of the motor 13 drives the motor 13 in accordance with the order signal given by the control circuit 50, so that the rotation control of the quartz glass 1 tube can be performed.

To the right of the drive control circuit 9 is provided a means 64 for mounting and feeding the cylindrical body having a rack portion 64a, in a slidable manner by using a gear 59 controlled by a control means 60 equipped with a motor.

The means 64 for mounting and feeding the cylindrical body is equipped with a member, a mechanism, etc., which hold a quartz glass plate as is described in detail below.

A band-like quartz glass plate 3 is provided on the outer peripheral plane of the aperture end portion of the quartz glass tube 1 in such a manner that a pressure F can be properly applied by the cross section thereof. More specifically, in the initial stage, the front end of the quartz glass plate 3 is pressed at a pressure F in a range of from 300 to 400 gf against the outer peripheral plane of the glass tube 1 by an end plane 3a having a cross section area of about 2×30 mm, being inclined from the a upper side in a wedge-like state. During operation, the quartz glass plate 3 is pressed against the outer peripheral plane of the quartz glass tube 1 by the pressure F for a cross section area of 10×30 mm. Preferably, the pressure F is 350 g.

The quartz glass plate 3 is mounted on a feed detection roller 21, which detects the amount of fed quartz glass plate by a feed roller 22 and an encoder 19. At the same time, the quartz glass plate 3 is provided at a fixed position by pairs of press rollers 28, 28 and 29, 29, each pair being arranged separated from the other pair by a predetermined distance set by driving air cylinders 32 and 33, and which take hold of the both side planes extended in a ribbon-like manner.

Once the quartz glass plate 3 is set in the aforementioned state with its position being limited, an air cylinder 34 is driven so that pressure may be applied from the upper side to the quartz glass plate 3 by a pressing roller 23, while assuring that the quartz glass plate 3 may be favorably sent out and that the detection is finely realized by the feed detection roller 21.

Furthermore, a signal is transferred to a control means 17 from the control circuit 50 to control the rotation speed of the motor 14, while the motor 14 may be rotated at a constant torque by applying the aforementioned pressure F.

In addition, an electromagnetic clutch 35 is provided between the feeding motor 14 which sends out the quartz glass plate 3 and the feeding roller 22, so that the torque to the roller 22 can be controlled by the connection state of the clutch.

The electromagnetic clutch 35 is provided between the input and the output in such a manner to make the axial torque controllable; the attach rate of the clutch can be selected by controlling the magnetic force applied to the clutch, which thereby selects the holding force applied to the clutch plate.

On stopping the feed of the quartz glass plate 3, the connection between the feeding roller 22 and the feeding motor 14 is cut by the clutch 35.

A brake 36 is further provided to the feed detection roller 21. On receiving a signal from the control circuit 50, the brake 36 is driven electrically and synchronously with the release of clutch 35 connection, so that the sending out of the quartz glass plate 3 is stopped accordingly.

A burner control means 18 is provided between the displacement detection roller 26 and the drive control unit 9. Furthermore, the burner control means 18 comprises a first burner 6 and a second burner 7 arranged in such a manner that the melting position at the end plane and the periphery thereof of the quartz glass plate 3 may be heated and molten from the upper side and the lower side of the glass plate. The first burner 6 and the second burner 7 are each provided rotatable around the rotation centers 6a and 7a, respectively, and in such a manner that the melting position may be moved in the extended direction of the quartz glass plate 3.

An embodiment according to the key portion of the functional component according to the present invention is described below by making reference to FIGS. 4 and 5.

Figure 4:
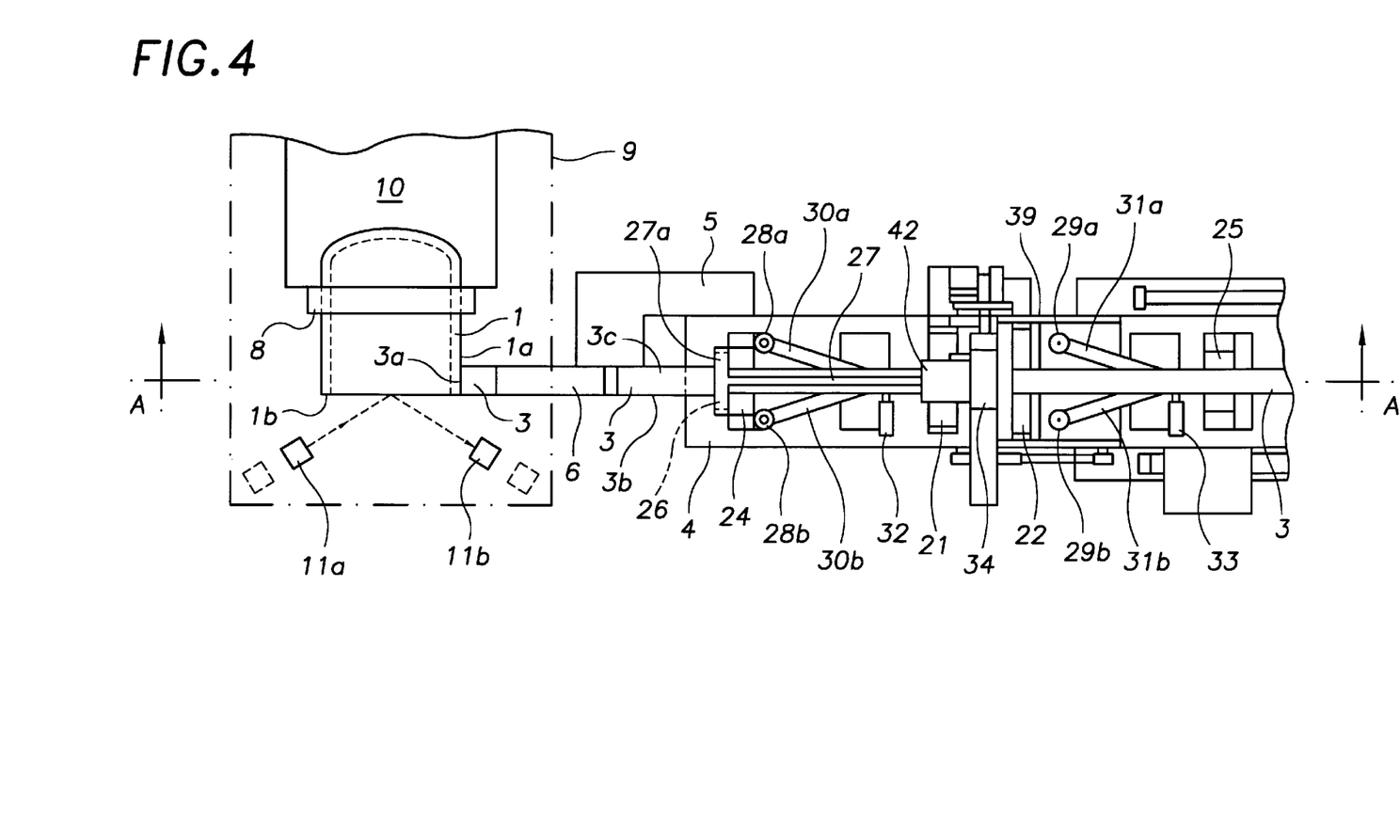
FIG. 4 is a planar view showing the important portion of the mechanism.

FIG. 4 shows the planar view of the main portion of the functional component, and FIG. 5 shows the cross sectional view taken along line A—A given in FIG. 4. Referring to the figures, a quartz glass tube attaching portion 10 is provided in the drive control unit 9. The quartz glass tube 1 is held by a chuck 8 located in front of the quartz glass tube attaching portion 10, and a sensor 11 which detects the position in the axial direction of the quartz glass tube 1 is also provided.

The quartz glass plate 3 is mounted on rollers 24 and 25, a feed roller 22, and the feed detection roller 21 set on the base table, so that the side plane 3b thereof is provided in correspondence with the end plane 1b of the quartz glass tube 1, and the side plane 3a is brought into contact with the outer periphery 1a of the quartz glass tube 1.

On the sides of the side planes 3a and 3b of the quartz glass plate 3 are provided press rollers 28a and 28b in such a manner that they may be separated from each other by driving an air cylinder 32. Furthermore, press roller 29a and 29b are provided on the sides of the above side planes in such a manner that they may be separated from each other by driving an air cylinder 33.

Furthermore, on the side of the drive control unit 9 on the base table 4, a burner attaching table 5 having provided thereon a first burner 6 is provided, whereas a third burner 57 attached to a burner control means 58 is given on the left side of the drive control unit 9.

To make the above constitution better understood, further description is given below referring to FIG. 5. In the figure, a base table 4 is placed on an attaching plate 67 supported by a leg portion 68, and a burner attaching table 5 is placed on the base table 4. The first burner 6 and the second burner 7 are provided to the upper side and the lower side, respectively, of the quartz glass plate 3, and are placed on the burner attaching table 5 in such a manner that they can heat and melt the periphery of the quartz glass plate 3 inclusive of the end plane 3a. Moreover, the burners are placed in such a manner that the melting position may be varied around the rotation centers 6a and 7a.

The feeding roller 22 is connected in a rotatable manner by means of a belt 38 to one of the rotation shafts of the electromagnetic clutch 35 that is provided to the lower side of the base table 4, and the other rotatable portion is connected with a feeding motor 14 via the clutch portion.

Furthermore, the feed detection roller 21 is connected to the rotary shaft of the brake 36 provided on the lower side of the base table 4 by a belt 37. When the brake is operated by bringing the rotating shaft into a halt according to a signal from the control circuit 50, the detection roller 21 is stopped while also friction stopping the quartz glass plate 3. At the same time, the rotation times of the detection roller is detected by the encoder 19.

The air cylinder 34 is provided to the upper portion of the attaching plate 39 set on the upper plane of the base table 4. Further, a detection arm attaching plate 42, which applies a predetermined pressure to the lower side by the operation of the air cylinder is provided to the air cylinder 34, and to the detection arm attaching plate 42 is furnished with the feeding roller 22 and a pressure roller 23 which assures stable contact state between the quartz glass plate 3 and both of the feed detection roller 21 and the feeding roller 22 by applying pressure to the middle point thereof.

Furthermore, to the aforementioned detection arm attaching plate 42 is provided a detection arm 27 having, on the front end thereof, a detection roller 26, which is brought into contact with the upper plane of the quartz glass plate 3 and detects the displacement, and an encoder 20 which detects the moved distance of the detection arm.

Accordingly, the control circuit 50 is constructed as such that the output is sent out to the gripping means 61 in accordance with the result obtained by calculating the amount rotated of the glass tube 1 or the amount fed of the glass plate 3.

The means 64 for mounting and feeding the cylindrical body furthermore comprises a rack portion 64a, and because the rack portion 64a is fitted to a drive gear 59 of a gear control means having an embedded motor, the control circuit 50 is constructed as such that the output may be sent to the gear control means 60 after calculating the amount rotated of the glass tube 1 or the amount fed of the glass plate 3.

The mode of operation of the embodiment of the present invention having the constitution above is described below.

On operation, various parameters are input into the control circuit 50 from an input device not shown in the figure. The parameters include the diameter and the wall thickness of the glass tube 1 to be welded, the plate thickness and the width of the glass plate 3, the initial value of the control pulse frequency for the motor 13 which rotates the glass tube 1, the initial value of the control pulse frequency for the motor 14 which feeds the glass plate 3, and the initial value of the clutch 35 which is incorporated between the motor 14 and the feeding roller 22 and controls the transmission torque.

In the CPU 52, the necessary rotation times of the glass tube 1, the necessary feeding amount of the glass plate 3, etc., are arithmetically derived, and the quantity of movement as well as the timing of movement of the means 64 for mounting and feeding the cylindrical body, the timing of moving the gripping means 61, etc., are determined therefrom.

Referring to FIG. 2, when the quartz glass tube 1 is attached to the chuck 8 of the quartz glass tube attaching portion 10, the aperture end plane of the glass tube 1 is found at position 1b'. The end plane of the quartz glass plate 3 mounted on each of the rollers is set at a previously fixed position 3a'.

Upon generating a START signal 55 by pressing a button on the control board not shown, the control circuit 50 sends out a starting signal to the control means 15 of the motor 12 (see FIG. 1). The motor 12 starts by the starting signal, and the quartz glass attaching portion 10 initiates its movement to the direction indicated by the arrow 43 shown in FIG. 2.

When the end plane 1b of the quartz glass tube 1 reaches the position shown by a solid line, the photoreceptor portion 11b of the sensor 11 sends out a signal to the control circuit 50, and the quartz glass attaching portion 10 ceases its movement at that position. Synchronously with the starting signal above, the control circuit drives the air cylinders 32 and 33 to bring the pair of press rollers 28a and 28b as well as the other pair of pressing rollers 29a and 29b into contact with the side planes 3c and 3b of the quartz glass plate 3 to match them with the end plane 1b of the quartz glass tube 1 by applying pressure to the side planes 3c and 3b.

The control circuit 50 then drives the cylinder 34 to apply a predetermined pressing force to the detection arm attaching plate 42 having provided thereon the press roller 23 and the encoder 20.

Then, a signal is sent to the clutch 35 to connect it with the motor 14, which is started at the same time. Thus, the quartz glass plate 3 is sent out by the roller 22 while the feed amount is measured via an encoder 19.

When the glass plate 3 is sent out from the predetermined position 3a' shown in FIG. 2 at a predetermined amount of feed, the control circuit brings the clutch 35 into a semi-connected state, and the end plane 3a of the glass plate 3 stops when it contacts the outer periphery of the glass tube 1.

Then, the first burner 6 and the second burner 7 begin to heat and melt the glass plate 3 by the end plane 3a and the peripheral portion inclusive thereof.

Synchronously with the heating operation, a signal is sent to the clutch 35 as to connect at a predetermined torque M, and the motor 14 is started by the control means 17 in order to send the quartz glass plate 3 by using the roller 22. At the same time, the quantity of feed is measured again by incorporating an encoder 19.

When the end portion inclusive of the end plane 3a of the glass plate 3 as well as the outer periphery of the glass tube 1 are molten, both members undergo melt adhesion. Synchronously with the melt adhesion, the motor 13 functions as to rotate the glass tube 1 in the counterclockwise direction shown in FIG. 1.

The end plane 3a of the quartz glass plate 3 is pressed against the outer periphery of the tubular portion of the quartz glass tube 1 by applying a predetermined torque thereto, so as to heat and melt the front end portion of the cylindrical body inclusive of the end plane.

If the pressure applied to the cylindrical body to press it against the object to be welded at this instance, the molten portion of the cylindrical body cannot be sufficiently pressed against the welding portion of the object. Thus, the welded portion results in the generation of pores due to the low inner pressure at the molten portion.

If the pressing force is high, on the other hand, the molten end portion of the cylindrical body is pressed by the force and runs in the width direction of the cylindrical body, and it results in a cylindrical body welded to the outer periphery of the object to be welded at an unnecessarily extended width. In such a case, the amount to be mechanically shaved after completion of welding increases, and the cylindrical body is welded thinly due to the molten portion that has run in the width direction thereof. Accordingly, it becomes impossible to obtain the required welding thickness.

Furthermore, in case the outer periphery of the object to be welded lacks high circularity, i.e., if it partly comprises a surface having a larger or smaller diameter around the center of rotation of the object to be welded, or an irregular outer peripheral surface, when the cylindrical body is sent out at a predetermined torque, the outer peripheral surface of the object to be welded changes. More specifically, as the outer peripheral surface approaches the molten edge portion of the cylindrical body beyond a standard value, the outer peripheral surface of the object to be welded is pushed back as to increase the feeding load applied to the cylindrical body, thereby resulting in a reduced amount of the supplied cylindrical body.

If the outer peripheral surface of the object to be welded changes in such a manner that the distance between the outer peripheral surface portion and the molten end portion of the cylindrical body increases, the feeding load decreases as to slightly increase the force of pressing. Thus, the quantity of supplying the cylindrical body increases.

Thus, even in case the object to be welded does not have a surface of high circularity, automatic control functions by applying a predetermined pressure to the cylindrical body even in case the shape of the surface changes.

Thus, because the constitution according to the present invention comprises sending out the cylindrical body against the object to be welded at a predetermined torque, the cylindrical body can be welded to the object to be welded at a predetermined thickness as to minimize the quantity shaved my mechanical process upon completion of welding.

However, as described above, if the force for pressing the cylindrical body against the object to be welded is decreased to an unnecessarily low level, and it results in a molten portion having a low inner pressure as to form a welded portion containing pores. On the other hand, if the force increases to an unnecessarily high level, it becomes impossible to obtain a welded portion having the necessary thickness.

Thus, it is preferred to constitute the present invention as such that the variation in torque of the cylindrical body is detected as such to control the torque to the predetermined value above. By thus constructing the present invention, the torque can be adjusted to a predetermined value even in case the feeding torque from the drive source fluctuates or the torque of the cylindrical body fluctuates due to an increase in friction of other drive mechanism.

A flange portion is formed after the outer periphery of the known glass tube 1 fully rotates once. However, if the brake 36 is operated and the connection of clutch 35 is released at the same time before the glass tube 1 completes the single rotation, the glass tube 1 completes its rotation while ceasing the sending out of the glass plate 3. Thus, in this case, the glass plate 3 can be cut automatically from the molten portion thereof.

The heating by using the burners is stopped thereafter.

It can be seen from the foregoing that, preferably, the rotation drive of the glass tube 1 is performed in such a manner that it may synchronize with a proper melting state, but that it may have some time difference with the heating by the burners. Furthermore, it is also preferred that the sending out of the glass plate 3 is stopped slightly before the completion of the rotation of the glass tube 1, and that the end plane of the glass plate welded to the outer peripheral plane of the glass tube 1 is matched with the melting portion to be cut.

The amount of rotation for the glass tube 1 can be calculated from the known outer diameter of the glass tube 1, the rotation speed, the plate thickness of the glass plate 3, etc., however, it may be calculated from the data obtained by detecting the feed by the feed detection roller 21 and the encoder 19. Thus, the position at which the glass plate 3 is cut is controlled by the feed of the glass plate 3 or the rotation and the like of the glass tube 1.

In the welding process above, the pressing torque for the glass plate 3 is controlled by the clutch 35. In this case, the torque that is applied to the glass plate 3 by the feeding roller 22 is detected by the detection roller 21 that is brought into contact with the lower plane, and the detected amount is transferred to the control circuit 50 as to accordingly control the torque.

Furthermore In the welding process, the speed of rotation of the glass plate 3 is controlled by the control means 17. In this case, the displacement of the detection roller 26 (as is shown by an arrow 40 or 41) that is brought into contact with the upper plane of the glass plate 3 is detected by the encoder 20, and the detected displacement is transferred to the control means 17 as to accordingly change the speed of the motor 14.

More specifically, the tubular portion of the glass tube 1 is rotated in the direction of the tubular periphery, and, at the same time, the glass plate 3 is fed in the direction of the tubular portion. If the amount to be heated and molten is equal to the amount wound up by the tubular portion, no displacement of the quartz glass plate 3 generates in the direction (indicated by arrows 40 and 41) crossing the feeding direction of the cylindrical body.

If the rotation speed of the glass tube 1 is too high as compared with the amount that is melt adhered to the glass tube 1, the quartz glass tube 1 drags the quartz glass plate 3 in such a manner that the quartz glass plate 3 is distorted in the direction indicated by the arrow 40. If the rotation speed of the glass tube 1 is too low, the amount of molten portion increases, and the force that attracts the solid portion of the quartz glass plate decreases as to cause displacement on the quartz glass plate 3 in the direction indicated by the arrow 41.

Thus, the amount of displacement is detected, and the rotation speed of the glass tube 1 is controlled to fall within a predetermined range depending on the amount of displacement. In this manner, the amount that is heated and molten can be set equal to the amount that is wound and melt adhered.

Furthermore, as described above, the glass plate 3 can be automatically cut by stopping the feed of the glass plate 3, and the burner can be constructed as such to set the melting position of the object to be heated controllable.

That is, by moving the heating means in the direction of increasing distance from the glass tube 1 synchronously with the cease of the glass plate 3 upon sending out the glass plate 3 for a predetermined quantity, the end plane of the glass plate can be stopped and cut at a position sufficiently set apart from the outer diameter of the thus formed flange portion. Thus, the outer periphery of the flange portion can be kept free from being contaminated by the sagging of the end plane of the glass plate due to delay of ceasing the heating operation of the heating means.

Figure 3:
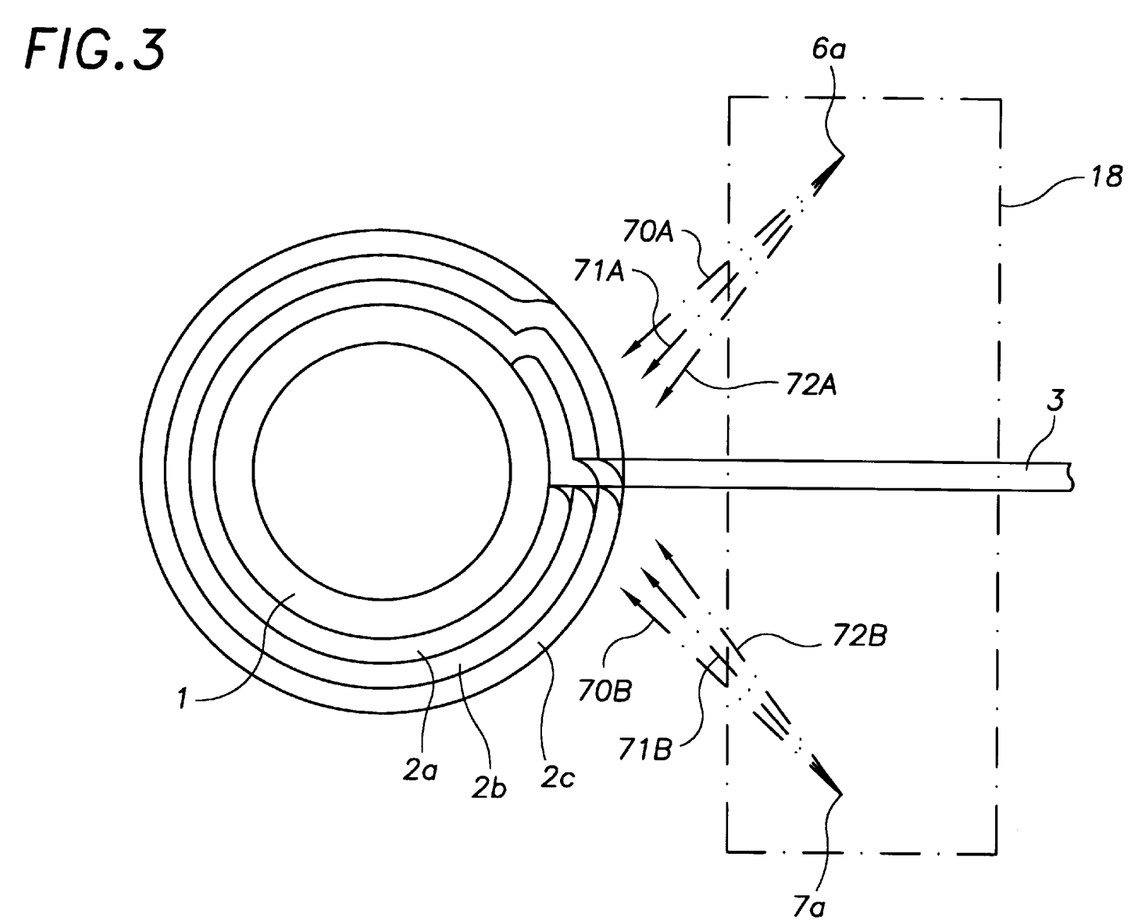
FIG. 3 is an explanatory diagram showing the operation in forming a flanged portion by overlapped winding.

Referring to FIG. 3, the operation of forming the flange portion by superposing and winding the glass plate 3 around the outer periphery of the glass tube 1.

The quartz glass plate 3 can be superposed and wound around the outer periphery of the quartz glass tube by bringing the end plane 3a of the quartz glass plate 3 and then rotating the quartz glass tube 1 for a plurality of times.

During the operation, if the glass tube 1 is rotated in such a manner that the quartz glass plate 3 is taken up once to form the flange portion 2a, the outer diameter of the flange can be increased by the plate thickness 2a.

Thus, by increasing the speed of outer periphery of the glass tube 1, the quartz glass tube 1 drags the quartz glass plate 3 in such a manner that the quartz glass plate 3 is distorted upward, and the amount of distortion is detected by the encoder 20 as to lower the peripheral speed in the outer periphery of the flange 2a. In this manner, the quantity of the glass plate 3 to be heated and molten can be matched with the quantity that is melt adhered to the glass tube 1.

Moreover, by taking up the glass plate 3 once, a flange 2b is formed, and the outer peripheral speed is lowered as to form a flange 2c in accordance with the previous peripheral speed.

In this case, by increasing the flange portion by superposing portions 2b and 2c, the diameter of the flange of the glass tube 1 becomes larger, and hence, the position to be heated and molten moves to the right side with increasing diameter of the flange. Thus, the burner jet angle of the first burner 6 changes accordingly from 70A to 71A, and then to 72A, while that of the second burner 7 also changes accordingly from 70B to 71B, and then to 72B to follow the changing position of heating and melting.

As described above, the rotation speed of the diameter to which the glass plate 3 is wound up can be set equal depending on the increasing diameter of the flange portion of the glass tube 1 by controlling the rotation speed of the tubular portion. Thus, the glass plate 3 cannot be taken up on the outer periphery of the flange while the glass plate 3 is still insufficiently stretched or shrunk due to the increase in speed of the outer periphery.

During the welding step above, the rotation of the glass tube 1 can be speed-controlled by the control means 16. More specifically, the speed is controlled by detecting the displacement (shown by the arrow 40 or 41) of the detection roller 26 provided in contact with the upper plane of the glass plate 3 by using the encoder 20, and by then transferring the detected value to the control means 16 and changing the speed of the motor 13 accordingly.

Thus, it can be seen therefrom that even in case it is impossible to control either of the supply rate of the cylindrical body or the moving speed of the molten portion, the other variable can be used for the control. Hence, a wider control range is provided and the control itself is facilitated.

In particular, in case the glass plate 3 is wound in a superposed manner, if a second turn of winding is superposed on the front end portion of the first turn, the rotation speed of the glass tube 1 must be decelerated in a short period of time during which the second turn is superposed and wound along the step shape of the front end portion of the first turn. Thus, in such a case, the speed of the glass tube 1 is decelerated to the speed of the second turn, while the feeding rate of the glass plate 3 is controlled and decelerated by means of the clutch 35, the control means 17, etc.

In the embodiment according to the present invention described above, the feeding quantity of the glass plate 3 is controlled by calculating the amount of rotated glass tube 1. Otherwise, the quantity of the glass plate 3 corresponding to the amount of rotated glass tube 1 can be detected, and either the rotation of the glass tube 1 or the feed of glass plate 3 can be ceased accordingly. Further the quartz glass tube and the quartz glass plate are welded by heating and melting the both. However, the present invention is not only limited thereto. Accordingly, so long as materials having the same melting temperature are used, other glass materials as well as metals can be used to weld with each other.

As described in the foregoing, the embodiment according to the present invention comprises bringing an end plane of a cylindrical body in contact with the outer periphery of the object to be welded, and feeding out the cylindrical body against the object to be welded at a predetermined torque. Accordingly, the welded portion can be obtained at a desired thickness dimension free of pores, and, moreover, the quantity to be mechanically shaved can be suppressed to a minimum level. Furthermore, even if the distance between the outer peripheral plane of the object to be welded and the molten end portion of the cylindrical body should fluctuate from the standard value, this fluctuation can be absorbed. Similarly, automatic control functions even in case the object to be welded does not have a high degree of circularity, or the shape of the surface should change.

That is, welding to the object can be performed at a constant state and at a constant shape without requiring any sophisticated technology or well trained manual skill, yet economically with less consumption of materials or processing steps.

Then, the operation at cutting the glass plate according to the second embodiment of the present invention is described below. Upon completion of sending out the predetermined quantity of the glass plate 3, the grip portion 61a of the grip means 61 makes hold of the glass plate 3 from the side planes thereof. Because the motor 62 moves further backward to the right, the glass plate 3 moves to the right direction and cut.

Synchronously with the cutting, the first burner 6 and the second burner 7 stop their operation, and the motor 62 turns reversibly upon finishing cutting. Then, the means 64 for mounting and feeding the cylindrical body moves to the left so that the both burners should return to the initial position.

The motor 14 stops synchronously with the movement of the gripping means 61 as to also cut off the clutch 35. Thus, by setting the speed of moving the means 64 for mounting and feeding the cylindrical body backward to the right higher than the rate of supplying the glass plate 3, the glass plate 3 can be cut surely without any delay even if this stopping operation and the cutting operation should be delayed.

In the embodiment described in detail above, the supply of the glass plate 3 is controlled by calculating the amount of rotation of the glass tube 1. However, the amount of supply of the glass plate 3 corresponding to the amount of rotation of the glass tube 1 can be detected as to stop the rotation of the glass tube or the supply of the glass plate 3 in accordance with the amount of supply.

Furthermore, in the embodiment above, the quartz glass tube and the quartz glass plate are heated and molten to weld them. However, the present invention is not only limited thereto, but usable are any materials having the same melting temperature, such as glasses or metals.

As described in the foregoing, the embodiment according to the present invention comprises bringing an end plane of a cylindrical body in contact with the outer periphery of the object to be welded; heating and melting the front end portion of the cylindrical body inclusive of the end plane; feeding the cylindrical body in the direction of the directly contacted portion by applying a predetermined torque to the cylindrical body in the direction of the object to be welded, while moving the welding zone in the direction of supplying the cylindrical body; detecting the displacement in the direction crossing with the feeding direction of the cylindrical body; and changing the supply rate of the tubular portion in accordance with the quantity of the displacement. Thus, even in case there is change in burner calories or burner shapes, a flange of a fixed shape can be formed on the tubular portion without requiring any sophisticated technology or well trained manual skill, yet economically with less consumption of materials or processing steps.

Furthermore, by setting the supply rate of the cylindrical body and/or the moving rate of the melting portion variable to control the supply of the cylindrical body, an efficient control can be performed even if one of the supply rate and the moving rate be higher than the controlled range, because the other functions for the control.

Figure 6:
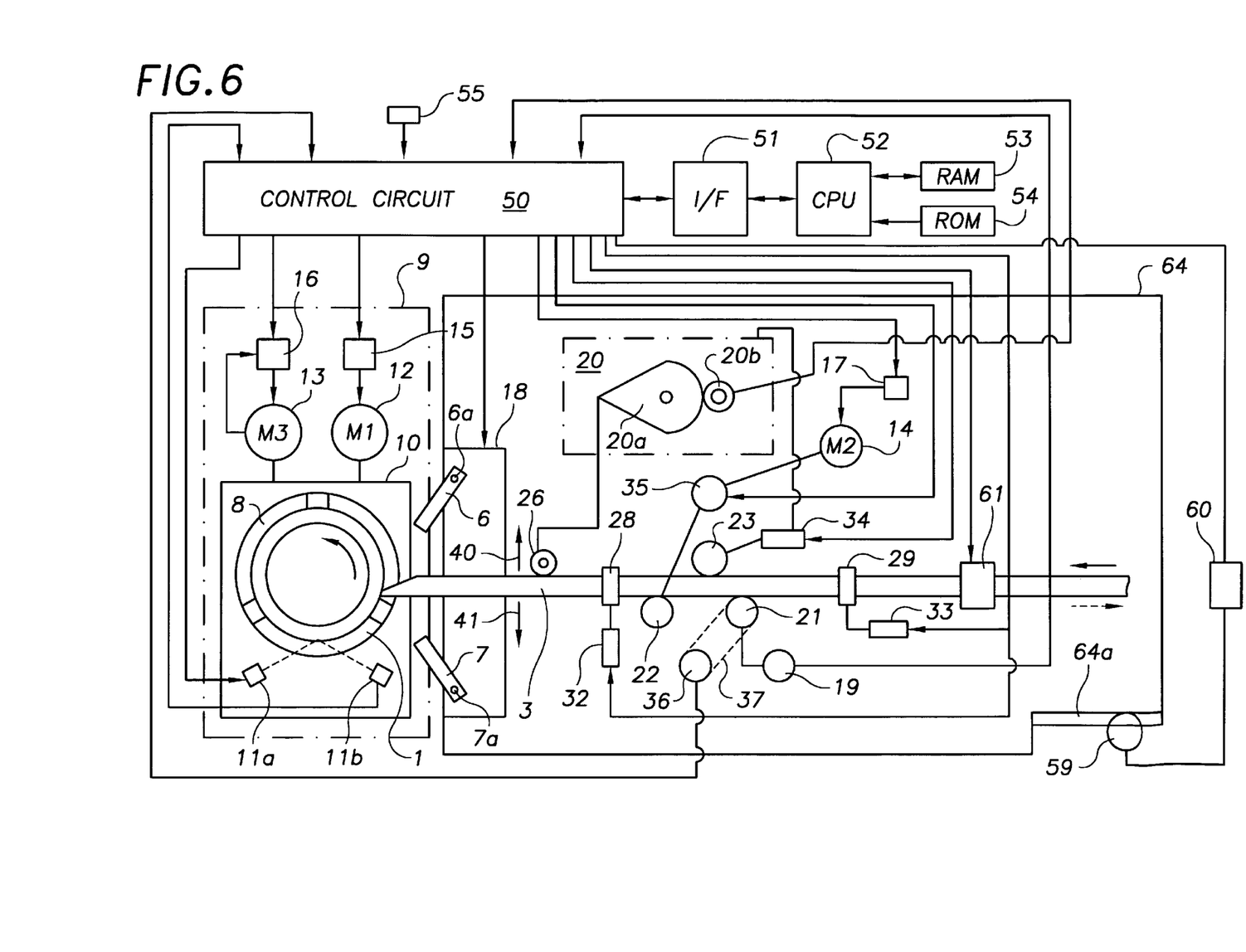
FIG. 6 shows a block constitution according to a further embodiment of the apparatus for according to the invention.

FIG. 6 shows a block diagram of the constitution according to a second embodiment of the present invention. The difference between this embodiment and the first one is that a means 64 for mounting and feeding the cylindrical body is provided slidable on a fixing table 27 instead of the base table 4 fixed on the fixing table 27, while setting the angle of the burners 6 and 7 fixed and providing a gripping means which take hold of the glass plate 3 from the sides of the width direction in the place of the brake 36. Thus, in case of winding the glass plate superposed, the feeding means 64 is moved backward to control the melting position, and upon completion of melting, the glass plate is held by the gripping means in such a manner to move the glass plate further backward so that the glass plate can be cut.

Accordingly, the control circuit 50 is constructed as such that the output is sent out to the gripping means 61 in accordance with the result obtained by calculating the amount rotated of the glass tube 1 or the amount fed of the glass plate 3.

The means 64 for mounting and feeding the cylindrical body furthermore comprises a rack portion 64a, and because the rack portion 64a is fitted to a drive gear 69 of a gear control means having an embedded motor, the control circuit 50 is constructed as such that the output may be sent to the gear control means 60 after calculating the amount rotated of the glass tube 1 or the amount fed of the glass plate 3.

Referring to FIG. 7, a second embodiment according to the present invention is described below.

FIG. 7 shows a cross section view corresponding to FIG. 5 related to the first embodiment according to the present invention. Referring to FIG. 7, the fixing table 27 fixed on the floor (not shown in the figure) by a leg portion 68 comprises a rail (not shown) fixed along the extending direction of the table, and the means 64 for mounting and feeding the cylindrical body is provided slidable on the rail.

An extended open portion 67a is provided to the central portion of the attaching plate 67, and a motor 14 and a clutch 35 are placed on the means 64 for mounting and feeding the cylindrical body via the open portion.

To the means 64 for mounting and feeding the cylindrical body is provided a burner attaching table 5, and a first burner 6 and a second burner 7 are fixed on the attaching table 5.

A pair of gripping means 61 is placed on the back of the roller 25 so that the glass plate 3 can be gripped from both sides in the width direction, and a gripping means 61 comprising a gripping portion 61a having a gripping plane made of a member having a high coefficient of friction, such as a rubber, is provided movable, upon a command signal sent from the control circuit 50, between a protruding position which is to be brought into contact with the side plane of the glass plate 3 and a separating position.

The rack portion 64a is cut out from the side plane of the means 64 for mounting and feeding the cylindrical body, in such a manner that the rack portion 64a may engage with a gear fixed to the drive shaft of the motor 62 to provide the means 64 for mounting and feeding the cylindrical body slidable.

The operation of the constitution according to the second embodiment of the present invention is described below. The control circuit 50 sends a signal to the gear control means 60 to drive the motor 62, and the gear 59 and the rack portion 64a are thereby operated in such a manner that the means 64 for mounting and feeding the cylindrical body may move to the left to set the first burner 6 and the second burner 7 to predetermined positions.

Then, a welding operation as described in the first embodiment above is performed, and when the amount of rotation of the glass tube 1 or the supplied amount of the glass plate 3 attains a predetermined value, the motor is operated reversibly as to move the means 64 for mounting and feeding the cylindrical body backward to the right. In this manner, the welding position of the heating means is controlled, and the glass plate 3 is lap wound.

Upon completion of sending the glass plate, the grip portion 61a of the grip means 61 makes hold of the glass plate 3 from the side planes thereof. Because the motor 62 moves further backward to the right, the glass plate 3 moves to the right direction and cut.

The motor 14 stops synchronously with the movement of the gripping means 61 as to also cut off the clutch 35. Thus, by setting the speed of moving the means 64 for mounting and feeding the cylindrical body backward to the right higher than the rate of supplying the glass plate 3, the glass plate 3 can be cut surely without any delay even if this stopping operation and the cutting operation should be delayed.

After the glass plate 3 is cut, the operation of the first burner 6 and the second burner 7 is stopped. Synchronized with this stop, the means 64 for mounting and feeding the cylindrical body moves to the left to return both of the burner positions to the initial positions.

In the embodiment described in detail above, the supply of the glass plate 3 is controlled by calculating the amount of rotation of the glass tube 1. However, the amount of supply of the glass plate 3 corresponding to the amount of rotation of the glass tube 1 can be detected as to stop the rotation of the glass tube or the supply of the glass plate 3 in accordance with the amount of supply.

Furthermore, in the embodiment above, the quartz glass tube and the quartz glass plate are heated and molten to weld them. However, the present invention is not only limited thereto, but usable are any materials having the same melting temperature, such as glasses or metals.

As described in detail above, in accordance with the first and the second embodiments of the present invention, there are provided methods comprising: bringing the end plane of the cylindrical body into contact to the outer periphery of the object to be welded; while supplying the cylindrical body to the direction of the object to be welded, heating and melting the front end portion of the cylindrical body inclusive of the end plane to weld it to the object to the welded; moving the welded portion in the direction of supplying the cylindrical body; while moving the welding zone, detecting the displacement of the cylindrical body in the direction crossing the direction of supplying the cylindrical body; and, in accordance with the quantity of the displacement, varying the rate of supplying the cylindrical body, or varying either or both of the rate of supplying the cylindrical body or/and the speed of moving the molten portion. Thus, even if there should be change in calories of burners or burner shapes, the cylindrical body can be fed at a constant melting state without requiring any sophisticated technology or well trained manual skill.

What is claimed is:

1. A method for producing an object having a flanged tubular portion at an outer periphery thereof, said method comprising:

supplying a continuously extended, elongated body made of the flange material to a welding zone at the tubular portion of the object and welding the flange material to the welding zone, said supplying of the elongated body to the welding zone being in a predefined feeding direction and with an adjustable feeding rate, heating a front end portion of the elongated body and melting it to the welding zone, continuously rotating of the object about a rotational axis with an adjustable rotation speed, whereby the welding zone is rotated with the tubular portion so that the elongated body is wound around the object, the elongated body contacting the object such that the elongated body is dragged in a direction perpendicular to the feeding direction to a degree which varies with the amount of melting of the front end portion of the elongated body to the welding zone, observing at least one boundary of the elongated body in order to detect a lateral displacement of the boundary in the direction perpendicular to the feeding direction; and providing an automatic control mechanism, in which the detected displacement is used as a regulating variable in control of at least one of the adjustable feeding rate or the adjustable rotation speed.

2. Method according to claim 1, wherein for the automatic control mechanism the adjustable rotation speed is used as a correcting variable which is modified to control the method.

3. Method according to claim 1, wherein an overall amount of material in the elongated body supplied to the welding zone is measured and the supply of the elongated body is automatically stopped after the amount has reached a predetermined maximum value.

4. Method according to claim 1, wherein a value representing a total amount of rotation of the object is controlled and the supply of the elongated body is automatically stopped after the value has reached a predetermined maximum value.

5. Method according to claim 3, wherein stopping the supply of the elongated body includes pulling the elongated body back in a direction opposite to the feeding direction.

6. Method according to claim 1, wherein the object is rotated around the rotational axis a plurality of times, forming a plurality of flange layers having a predetermined thickness, whereby the welding zone is moved in a direction perpendicular to the rotational axis in accordance with the overall thickness of the flange layers.

7. Method according to claim 1, wherein during melting to the welding portion, a torque is applied to the elongated body and the torque is controlled and adjusted to equal a predetermined value.

8. Method according to claim 4 wherein stopping the supply of the elongated body involves pulling the elongated body back in a direction opposite to the feeding direction.

9. Method according to claim 1 wherein, for the automatic control mechanism, the feeding rate is used as a correcting variable which is modified for control of the method.

10. Method according to claim 1 wherein the boundary of the elongated body is a plane surface.

11. Method according to claim 1 wherein the object and the elongated body are of quartz glass.

12. The method according to claim 1, wherein the feeding direction is at a perpendicular angle relative to a tangent to the tubular portion.

* * * * *